Dec. 25, 1928.  
S. A. SNELL  
1,696,214  
HEATER FOR AUTOMOBILES  
Filed July 30, 1926
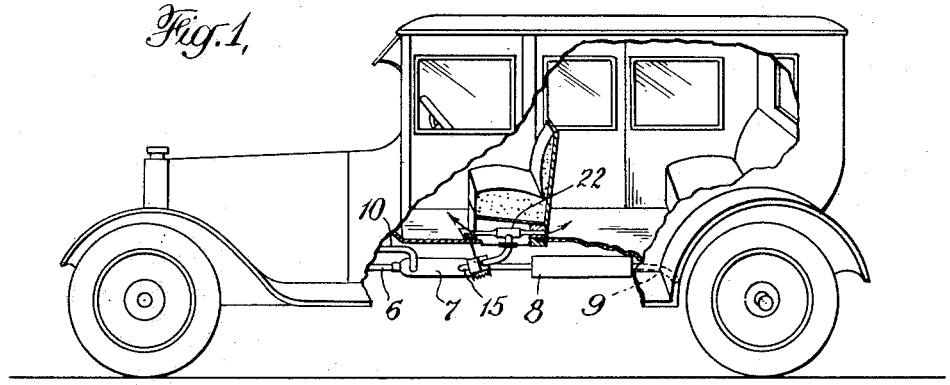
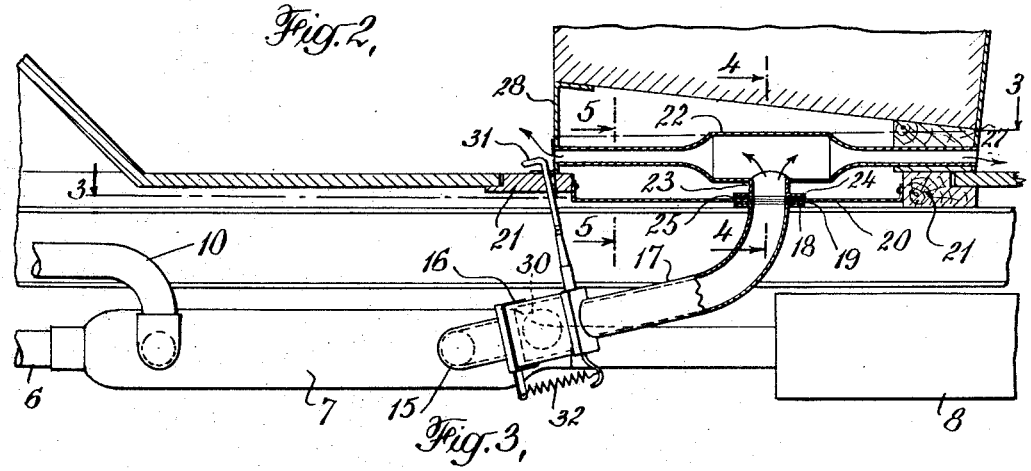
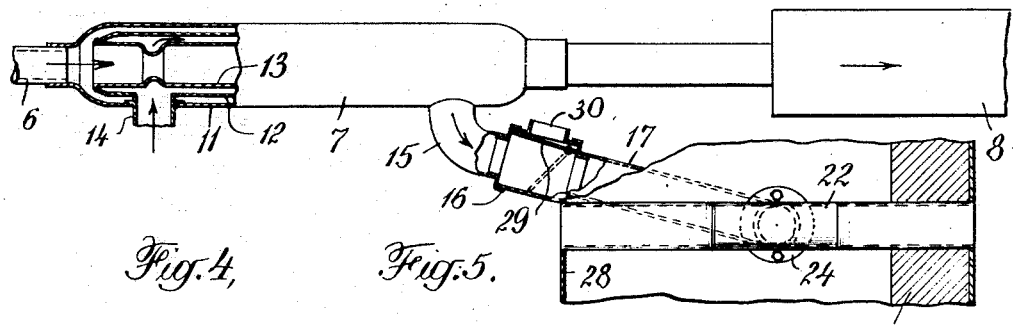
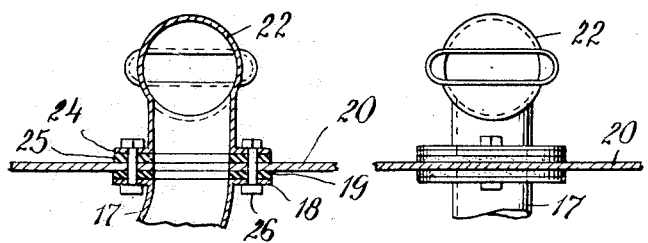
INVENTOR  
Samuel A. Snell  
BY  
ATTORNEYS Patented Dec. 25, 1928.

1,696,214

UNITED STATES PATENT OFFICE.

SAMUEL A. SNELL, OF DETROIT, MICHIGAN, ASSIGNOR TO FREDERICK C. MATTHAEI, OF DETROIT, MICHIGAN.

HEATER FOR AUTOMOBILES.

Application filed July 30, 1926. Serial No. 125,881.

This invention relates to heaters for automobiles and has reference more particularly to the construction of the parts whereby the heated air delivered by the heater is introduced into the body of the car. The type of heater with which the invention is employed is preferably that in which the exhaust gases from the engine are carried through a heater in the form of a heat exchanger whereby their heat is imparted to a current of air passing through the exchanger.

I have found that it is particularly desirable in the construction of heaters of this general type to introduce the heated air into the car in a horizontal direction at a point close to the floor of the car. When the heated air is introduced upwardly through an opening in the floor of the car as has been the common practice heretofore, it passes upward substantially directly, and if a window of the car is partially open for ventilation, much of the heated air passes directly out through the open window and the interior of the car is not adequately heated.

In the common types of closed body cars for four or more passengers, it is highly desirable to introduce the heated air into the space in front of the driver's heat as well as into the space in rear thereof. This is particularly true in the case of cars having a movable or stationary partition extending across the body at the rear of the driver's seat, but in the absence of any such partition, introducing the heated air into the space in front of the seat and near the floor is highly desirable.

In accordance with the present invention, the heated air flowing out from the heater is carried up through the bottom of the car at a point under the front seat, at which point the conduit for the heated air branches horizontally forwards and backwards, these two branches leading to outlets at the front and back of the seat. These outlets are directed horizontally and are close to the floor of the body of the car so that the air flowing therefrom passes along the floor of the spaces in front and in rear of the driver's seat.

The outlet piece through which the heated air flows may be formed from a piece of steel tubing, in which case the ends of this piece of tubing are preferably flattened somewhat so that the outlets for the heated air are elongated ovals. This causes the heated air to be introduced into the car body in a wide flat stream parallel with the floor. The piece of steel tubing may be shaped at the center thereof to form an extension or T flanged at its end, and the whole piece may be mounted in position by securing this flange upon the floor of the car over an opening therethrough, and, of course, it can be maintained securely in position by the outlet ends passing through similarly shaped openings in the front and rear walls of the seat.

The conduit leading up from the heater is similarly flanged at its end and secured to the bottom of the floor of the car in communication with the opening therethrough.

This form of heater lends itself to ready installation upon a car at low cost and facilitates the introduction into the conduit of a suitable valve device whereby the heated air may be directed into the car body or to the atmosphere as may be desired, and the introduction of the heated air horizontally near the floor both in front of and in rear of the front seat of the car gives excellent distribution of the heated air subject to convenient regulation as may be desired.

This and other features of the invention will be better understood by reference to the following description taken in connection with the accompanying drawings, in which Fig. 1 is a side view of a closed body automobile having the heater applied thereto, the central portion of the car being broken away to illustrate the heating elements; Fig. 2 is a longitudinal section of a portion of the car; Fig. 3 is a view partly in horizontal section on the line 3—3 of Fig. 2, showing the heating elements, and Figs. 4 and 5 are detail sectional views on lines 4—4 and 5—5 of Fig. 2.

Referring to these drawings, the hot exhaust gases from the engine pass through the exhaust pipe 6, then through the heater 7 and then through the muffler 8 to the tail pipe 9. Within the heater the hot gases pass in the heat exchanging relation to a current of air which is admitted to the heater through a pipe 10 which preferably leads from a point immediately in rear of the fan of the motor. The heater may be of any suitable construction, but that which I prefer to employ is the construction illustrated and described in my application for patent Serial No. 93,845, filed March 11, 1926. This heater consists generally of a casing 11 connected in the exhaust line at its ends and having therein a double wall air chamber formed by concentric tubes 12 and 13 which are secured together airtight at their ends. The outer tube has tubular extensions 14 formed thereon which pass through and are secured to the casing 11 for maintaining the air chamber in position as is illustrated in Fig. 3. At one end of the heater the extension which leads from the air chamber is connected to a tube 15 which conveys the heated air to an opening in the floor of the car.

The tube 15 may have a control device 16 connected thereto, and from the opposite end of the device a tube 17 constituting an extension of the air outlet 15 of the heater leads up to the body of the car. The end of this tube 17 is flanged outwardly as shown at 18 and is secured to the bottom of the floor of the car around an opening therethrough, a piece of non-metallic sound deadening material 19 being inserted between the flange 18 and the floor of the car.

In this particular instance, the floor of the car at the point where the tube 17 is connected thereto, is of sheet metal consisting of a pan 20 which is secured to the sills 21. This pan 20 has an opening therethrough of the size and shape of the opening through the conduit 17 and the flange 18 of the conduit is aligned with this opening.

The conduit for the heated air enters the car body at a point under the driver's seat and at its upper end is branched forwardly and rearwardly to outlets for delivering the heated air horizontally close to the floor at the front and at the rear of the driver's seat. For this purpose a T connection 22 is shown formed from a sheet metal tube and having its ends flattened somewhat as is indicated in the drawings. An integral neck 23 formed on this piece of tubing is flanged at its lower end as shown at 24 and this flange is secured to the upper surface of the floor 20 in alignment with the opening therethrough and therefore with the tubing 17. A washer 25 of sound deadening material is inserted under the flange 24. In this instance, where the floor 20 is a sheet metal band, bolts 26 are employed for securing the parts 17 and 22 in position with reference to the floor of the car, these bolts extending through the flanges 24 and 18, the non-metallic washers 19 and 25 and the holes in the floor 20. Where the floor 20 is of wood, screws may be employed for this purpose.

As shown in Fig. 2, the supports for the driver's seat at the front and rear edges thereof are provided with openings corresponding in shape to the ends of the tube 22 and these ends are received in the openings. In Fig. 2 one of these supports 27 is of wood and the other, 28, is shown as of sheet metal; in either instance a hole is provided to receive the end of the air conduit to locate and sustain it and the end of the conduit may be flush with the surface of the support.

The control device 16 may consist of a rectangular box to the opposite sides of which the pieces 15 and 17 of tubing are connected, and within this box is a vane 29 mounted on a pivot to swing to either of two positions, one shown in full lines and the other in dotted lines in Fig. 3. In the full line position it permits the heated air to flow through the box 16 to the car body, whereas in the dotted line position it shuts off this flow and forces the heated air to flow from the tube 15 through an outlet 30 in the side wall of the box. This vane 29 may be arranged to be operated by a handle 31 projecting up through the floor of the car at a point close to the floor and to the front wall of the driver's seat so that he can manipulate it conveniently, and a spring 32 is arranged to hold the vane yieldingly in either of its two positions to which it is moved. In practice I have found that ample regulation of the effect of the heater may be obtained readily and steadily by manipulation of the damper 29 together with the usual regulation of the extent of opening of the windows of the car.

While I have described the conduit for the heated air as leading into the car through the floor beneath the driver's seat, in some cars the front seat which I have referred to as the driver's seat, is divided. With that arrangement, the conduit may be placed beneath either half of the seat or in the space between the seats, as desired.

It will be apparent from the foregoing that the heated air from the heater flows under the control of the damper up through the floor of the car at a point under the driver's seat and then out both forward and backward horizontally close to the floor. By this construction excellent distribution of the heated air is obtained. The interior of the car is heated both in front of and in rear of the driver's seat and in each of these spaces the heating is substantially uniform by reason of the incoming heated air being directed horizontally over the floor. If there is any greater heat at one point than at another, it is close to the floor and that is desirable rather than objectionable. Furthermore, the construction illustrated and described is one which may be manufactured at low cost and installed upon a car readily and inexpensively.

I claim:

1. A register for use in a closed automobile divided into compartments and having an air heater beneath the floor thereof and a conduit leading upwardly from the heater, which comprises a conduit member connected to the conduit to receive heated air from the heater, and a branch disposed between compartments and connected to the member and having a plurality of outlet openings above the level of the floor and arranged to deliver heated air into the several compartments of the automobile body horizontally over the floor.

2. A register for use in a closed automobile having an air heater beneath the floor thereof and a conduit leading upwardly from the heater, which comprises a conduit member connected to the conduit to receive heated air from the heater and lying beneath a seat in the automobile, and a branch connected to the member and leading to openings through the front and rear vertical walls of the seat for delivering heated air into the automobile horizontally over and close to the floor thereof within the body.

3. A register for use in a closed automobile divided into front and rear compartments by a front seat and having an air heater beneath the floor thereof, and a conduit leading upwardly from the heater, which comprises a conduit member connected to the conduit and lying above the floor level of the automobile, and branches from the conduit member extending forwardly and rearwardly therefrom and terminating in outlet openings spaced from the floor to direct heated currents of air horizontally over the floor into both compartments.

4. A register for use in a closed automobile having an air heater beneath the floor thereof and a conduit leading from the heater to an opening in the floor, which comprises a conduit member mounted on the floor above the opening and in communication through the opening with the conduit, a sound-insulating element placed between the end of the conduit member and the floor, and branches from the conduit member extending forwardly and rearwardly therefrom and terminating in outlet openings spaced from the said floor opening and lying close to the floor to direct currents of heated air substantially horizontally over the floor in both directions.

5. A register for use in a closed automobile having an air heater beneath the floor thereof and a conduit leading upwardly from the heater, which comprises a conduit member mounted beneath a seat of the automobile and in communication with the conduit, and branches from the conduit member lying beneath the seat and extending forwardly and rearwardly therefrom with their ends entering and secured in openings in the vertical walls of the seat, these branches having outlet openings lying close to the floor to direct currents of heated air substantially horizontally over the floor in front and to the rear of the seat.

6. A register for use in a closed automobile having an air heater beneath the floor thereof and a conduit leading from the heater to an opening in the floor beneath one of the seats of the automobile, which comprises a conduit member mounted on the floor beneath the seat and above the opening, this conduit member being in communication with the conduit through the opening, and horizontal branches from the conduit member extending forwardly and rearwardly therefrom and through the vertical walls of the seat, these branches terminating in outlet openings of horizontally elongated shape which lie close to the floor and direct currents of heated air substantially horizontally over the floor to the front and rear of the said seat.

7. In a closed automobile divided into compartments and having a heater for air beneath the floor thereof, the combination of a conduit leading upwardly from the heater, a control device in this conduit having an operating handle extending through the floor of the automobile, a conduit member disposed between compartments and connected to the conduit, and branches from the conduit member extending forwardly and rearwardly thereof, for delivering heated air into the several compartments of the automobile body horizontally over the floor.

8. In a closed automobile having a heater for air beneath the floor thereof, the combination of a conduit leading from the heater to an opening in the floor, the end of the conduit being secured to the floor with sound-insulating material interposed between the end of the conduit and the floor, a conduit member mounted on the floor above the opening and in communication through the opening with the conduit to receive heated air therefrom, and branches from the conduit member extending forwardly and rearwardly therefrom and terminating in outlet openings lying close to the floor to direct currents of heated air substantially horizontally over the floor in both directions.

9. In a closed automobile having front and rear compartments separated by a front seat and having an air heater beneath the floor of the car, the combination of a conduit leading from the heater to an opening in the floor beneath the front seat, a conduit member beneath the seat mounted on the floor above the opening and in communication through the opening with the conduit to receive heated air therefrom, and branches extending forwardly and rearwardly from the conduit member through the front and rear vertical walls of the seat, these branches terminating in outlet openings lying close to the floor to direct currents of heated air substantially horizontally over the floor to the front and to the rear of the said seat.

10. A register for use in a closed automobile divided into compartments and having an air heater beneath the floor thereof and a conduit for heated air leading upwardly from the heater, which comprises a conduit member connected to the conduit to receive heated air therefrom, this member lying beneath a seat in the automobile, and branches from the conduit member, the ends of which enter and are secured in openings in both vertical walls of the seat adjacent the floor, whereby heated air from the branches is discharged into the several compartments of the body of the automobile close to and horizontally over the floor thereof.

In testimony whereof I affix my signature.

SAMUEL A. SNELL.